June 12, 1928.  
W. H. BICE ET AL  
1,673,487  
HYDRAULIC TRANSMISSION CONTROL  
Filed July 18, 1925  
4 Sheets-Sheet 1

Fig.1.

Inventor  
Walter H. Bice,  
William E. Bice,  
By  
Attorneys

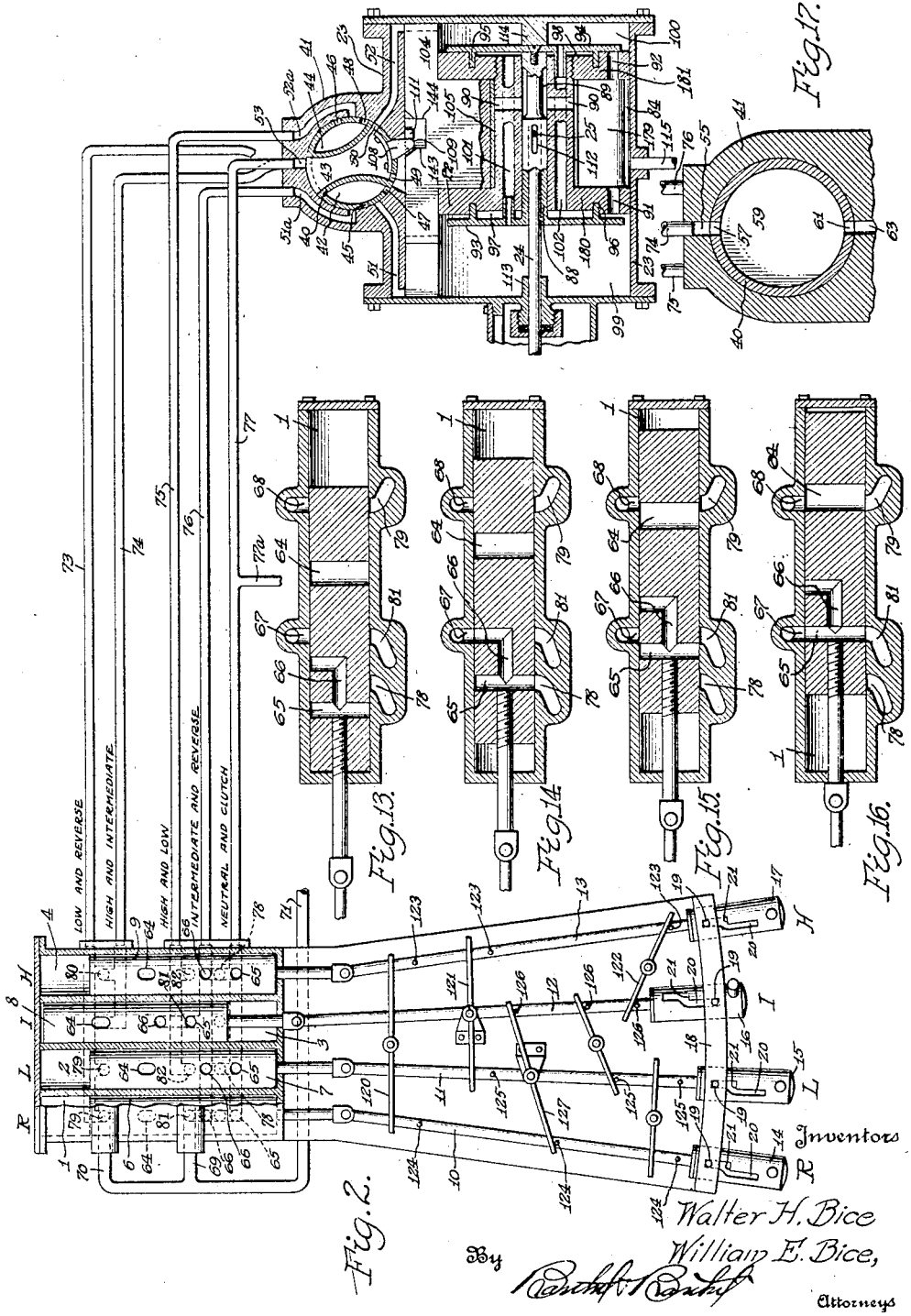

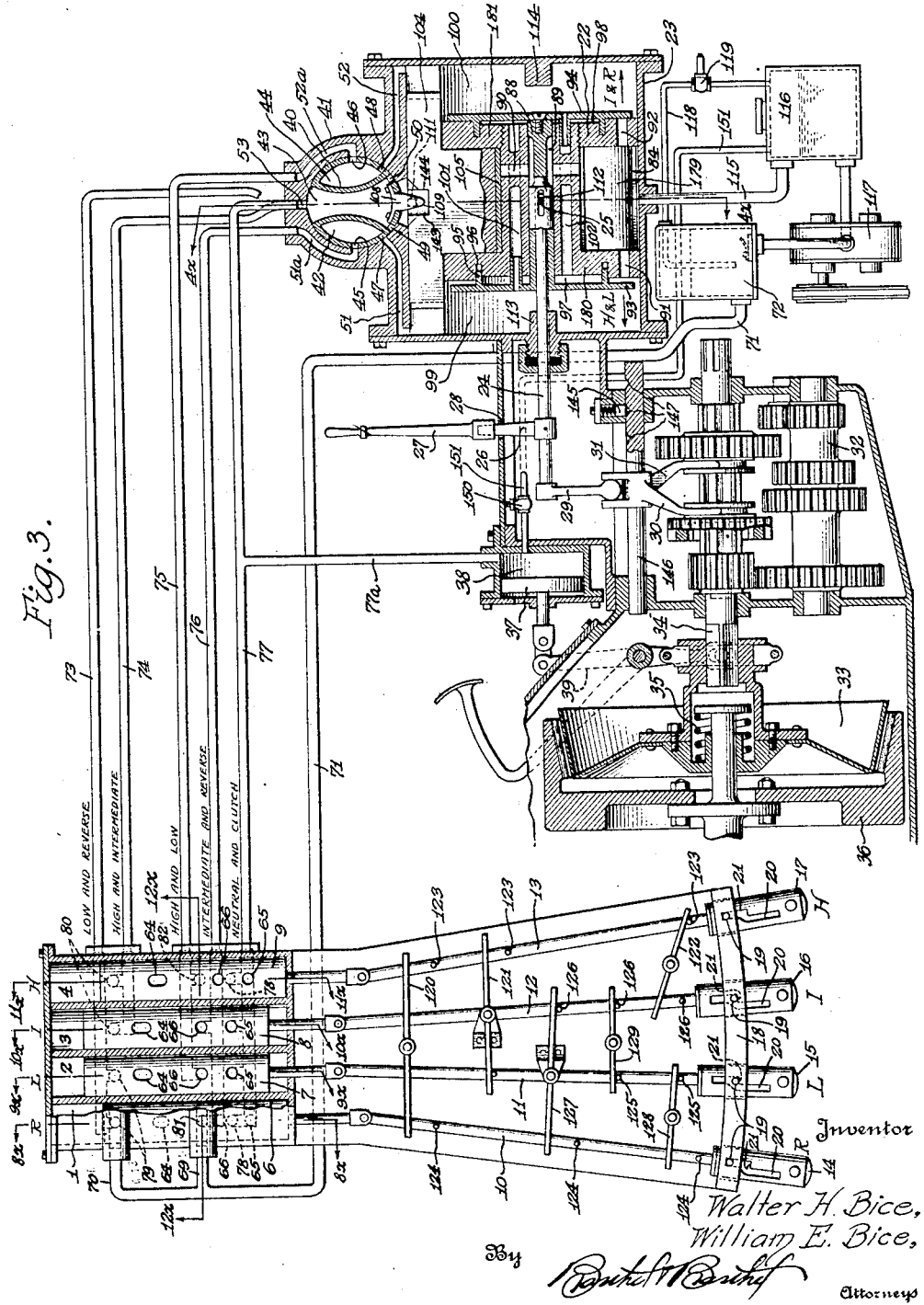

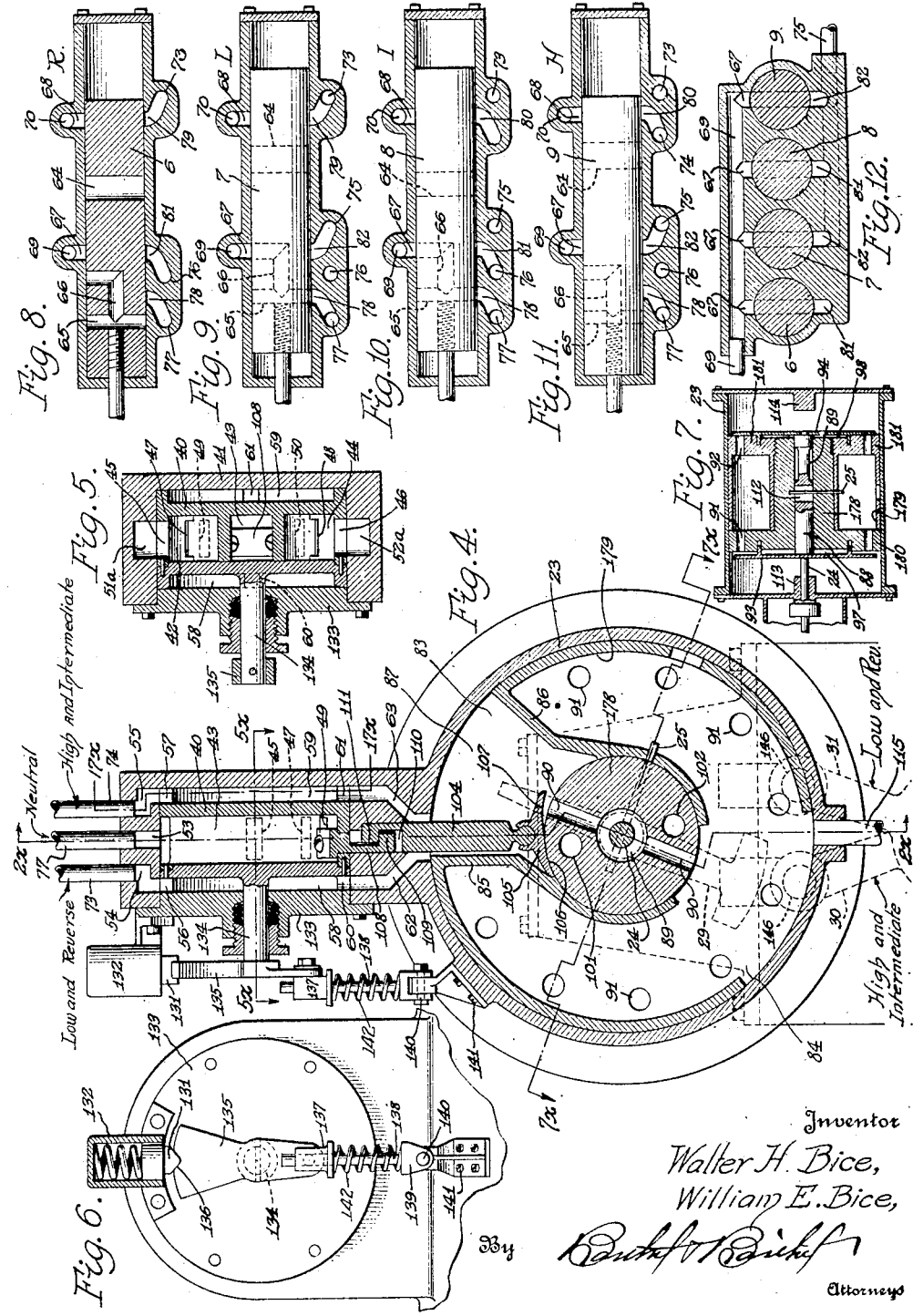

Patented June 12, 1928.

1,673,487

UNITED STATES PATENT OFFICE.

WALTER H. BICE AND WILLIAM E. BICE, OF DETROIT, MICHIGAN.

HYDRAULIC TRANSMISSION CONTROL.

Application filed July 13, 1925. Serial No. 44,585.

This invention relates to the hydraulic control of change speed gear mechanisms whereby the changing from one speed to another may be effected simply by the selective operation of valves, and has for one of its objects to provide means whereby a common gear operating piston may be operated to effect both the sliding and the rotation of a gear selecting and changing member so that required gears may be intermeshed or brought to neutral positions according to the valve selection effected.

A further object is to provide for the operation of gear selecting means by a piston capable of both reciprocation and rotation, a master valve adapted to control the reciprocation and rotation of the said piston, and a selective valve system determining the actuation of said piston through the medium of said master valve to bring about any required setting of the gears.

The invention further aims to include means controlled by said selective valve device, hydraulically releasing a clutch when a change of gear is being effected.

Further objects are to provide in a hydraulically actuating gear operating piston, a valve system operable by momentum of moving parts carried with or by the piston whereby the release of pressure behind the piston upon the completion of its stroke in one or other direction is insured; and to provide for the operation of such valve system under circumstances where the momentum of the piston does not become effective in such manner whereby the release of pressure on either end of the piston may be controlled by the operation of the selective valve device.

The invention also contemplates in a gear operating device wherein a gear shifting piston is reciprocal for the engagement of gears and rotatable for the selection of such gears, the provision of means ensuring such rotation of the piston in the required direction when in a neutral position and before reciprocation is imparted to the piston to effect gear engagement; and incidently the invention proposes to provide means to ensure the piston being brought to a neutral position between all changes of gear.

Many other objects subsidiary to the aforesaid objects, or resulting from the construction or operation of the invention as it may be carried into effect, will become apparent as the said invention is hereinafter further disclosed.

In carrying the said invention into effect, we may provide in combination with a change speed gear mechanism including gear selector and shifting forks; a piston provided with fork engaging means and adapted upon reciprocation (or rotation) to effect the engagement of gears, and, in a neutral position, to rotation (or reciprocation) for the purpose of selecting the fork to be operated; a master valve controlling the reciprocation and rotation of the piston, and itself controlled in its operation by the movement of said piston; a selective valve system adapted to manual operation to determine the admission of fluid under pressure through said master valve to said piston whereby the direction of reciprocation or rotation of the piston is governed and effected, and clutch operating means controlled by said selective valve system in such manner that the gear mechanism is automatically declutched during the changing of gears.

All of which is more particularly described and ascertained hereinafter, by way of example, having reference to the accompanying drawings, wherein—

Figure 1 illustrates more or less in a schematic manner, and mainly in section, the application of the invention to a change speed gear and clutch, the parts being indicated in the positions which they occupy when the gear is set in a high gear position;

Figure 2 is a fragmentary view similar to Figure 1, indicating parts in their intermediate gear position;

Figure 3 is a similar view to Figure 1, illustrating the parts in the positions which they occupy when the gear mechanism is set in neutral, the sections through the main cylinder and master valve in the said Figures 1 and 2 being taken on the line 2$^x$—2$^x$, Figure 4;

Figure 4 is a transverse section through the main cylinder and master valve taken on the line 4$^x$—4$^x$, Figure 3;

Figure 5 is a section through the master valve and casing taken on the line 5×—5×, Figure 4;

Figure 6 is an elevation of the face of the master valve casing, illustrating the master valve latch;

Figure 7 is a sectional plan taken on the line 7×—7×, Figure 4;

Figure 8 is a section of the reverse selector valve taken on the line 8×—8×, Figure 3;

Figure 9 is a section partly in elevation of the low gear selector valve taken on the line 9×—9×, Figure 3;

Figure 10 is a similar view of the intermediate gear selector valve taken on the line 10×—10×, Figure 3;

Figure 11 is a similar view of the high gear selector valve taken on the line 11×—11×, Figure 3;

Figure 12 is a transverse section of the selector valves taken on the line 12×—12×, Figure 3;

Figures 13, 14, 15 and 16 indicate in section four different positions which may be occupied by any one of the valves; and Figure 17 is a section through the master valve taken on the line 17×—17×, Figure 4.

Similar characters of reference indicate similar parts in the several figures of the drawings, and Figures 1, 2, 3, 7 and 17 are drawn to much smaller scales than the remaining figures of the drawings.

Generally speaking, the invention comprises a hydraulic clutch operating device, a hydraulic gear operating device, a selector valve mechanism by means of which said gear operating device is operated in a required manner to bring about the actuation of the change speed gear according to the gear ratio desired, a master valve operable by the gear operating device to ensure the proper distribution of pressure to the piston of the operating device for its reciprocation and for its rotation, and means supplying fluid under pressure to the selective valve device through the medium of which it is distributed to the various parts of the gear operating device and the clutch operating device.

The selective valve device is shown as including cylinders 1, 2, 3 and 4 hereinafter referred to as the reverse, low, intermediate and high cylinders and piston valves 6, 7, 8 and 9 are similarly named according to their cylinders as are other movable parts directly associated with each of the said valves, such as the valve operating rods 10, 11, 12 and 13 and buttons 14, 15, 16 and 17. These buttons are rotatably mounted on the ends of the said rods and reciprocally mounted in a frame 18 which is provided with pins 19 for the guidance of the said buttons, which have slots 20 therein offset intermediate of their lengths, as at 21, so that the direct reciprocation of the buttons throughout the limitations set by the ends of the slots is interrupted by the offset parts of the slots, thereby necessitating a slight rotation of the buttons before such movement may be completed, the reason for which will become apparent as the operation of the device as a whole is further described. The reciprocation of these buttons of course results in the consequent reciprocation of the piston valves 6, 7, 8 and 9 according to the button operated and the direction of its operation.

These valves, the operation of which is yet to be more fully described, selectively control the flow of fluid under pressure through different channels to a gear operating device which includes a piston 22 reciprocal in a cylinder 23 and also capable of partial rotation in the said cylinder, and a piston rod 24 secured to the said piston by the pin 25 so that it is reciprocal and rotatable therewith. It is through this rod that the gears are selected and shifted by the rotary and reciprocating action of the said piston 22, and 26 is a gear shift lever which may be manually operated if so desired by means of an extension 27, the said lever operating in an H slot 28 in the manner well known in connection with automobile gear shifting levers.

At the outer end of the piston rod 24 is a gear selector arm 29 which is adapted to engage with either the high and intermediate gear selector fork 30 or the low and reverse gear selector fork 31 of a change speed gear mechanism 32, the nature of which is so well known that more particular description of the said gear mechanism is not thought to be necessary. 33 indicates a cone clutch slidably connected to the driving shaft 34 of the change speed gear and adapted to be pressed by the spring 35 into engagement with the flywheel 36 or other suitable driving part of an engine or motor with which the change speed gear is used; and for the operation of this clutch, a piston 37 is provided, reciprocating in a cylinder 38 and operatively connected to the clutch through the medium of a pivoted lever 39.

It will be quite apparent that gear selection is simply a matter of partial rotation of the piston 22 in one or other direction to bring the arm 29 into engagement with one or other of the gear selector forks 30 and 31 and the reciprocation of the piston backward or forward to cause the selected arm to move its particular sliding gear into mesh with one or other of gears of different ratio, and that, therefore, the hydraulic selection and shifting of gears simply resolves itself into the question of admitting hydraulic pressure to one or other side of the piston and also to hydraulically effecting the partial rotation of the piston in one or other direction. In the type of gear shift shown, this rotation of the piston is required to take place intermediate of its stroke as it is in this position the lever 26 is opposite the transverse part of the H-slot and the forks 30 and 31 are in their intermediate position.

Attention is now directed to what is termed, for the sake of identification, a "master" valve 40 which is housed in a casing 41 extending upwardly of the cylinder 23 and is in the form of a rotary drum partioned transversely into three chambers 42, 43 and 44, the said chambers 42 and 44 being provided with inlet ports 45 and 46 respectively, and outlet ports 47 and 48. The chamber 43 is adapted to receive fluid at its upper end and has outlet ports 49 and 50 at its lower end.

51 and 52 are inlet ports of the cylinder 23 communicating with the ports 47 and 48 of the said chambers 42 and 44 when the master valve is in the position illustrated in Figures 3, 4 and 5, which position is hereinafter referred to as the "neutral" position as it is that which the master valve assumes when the apparatus is operated for the bringing of the change speed gear to neutral position. This term is also applied to the positions of the piston 22 and to the relative positions of the selector valves and buttons indicated in Figure 3.

The master valve casing is provided with passages 51$^a$ and 52$^a$ communicating with the inlet ports 45 and 46 in the neutral position of the parts, a passage 53 communicating with the inlet end of the chamber 43 and passages 54 and 55 communicating with inlet ports 56 and 57 of chambers 58 and 59 on opposite sides of the master valve. These chambers have outlet ports 60 and 61 which in the neutral position of the valve communicate with cylinder passages 62 and 63 respectively.

Referring now to the selector valve device. It will be noted that each of the valves 6, 7, 8 and 9 is identical in form and has transverse passages 64 and 65 therein, the latter also having a communicating branch passage 66, the outer end of which is intermediate the two first mentioned passages, and the cylinders 1, 2, 3 and 4 are each provided with similar inlet passages 67 and 68 with which branches 69 and 70 of a feed pipe 71 communicate. This pipe is intended to convey fluid, preferably oil, under pressure from a pressure tank 72 to the said inlet passages 67 and 68.

On the opposite side the cylinders are provided with three ports communicating variously with conduits 73, 74, 75, 76 and 77 as follows: The innermost ports 78 of the said cylinders all communicate with the conduit 77, the outermost ports 79 of the cylinders 1 and 2 with the conduit 73, the outermost ports 80 of the cylinders 3 and 4 with the conduit 74, the intermediate ports 81 of the cylinders 1 and 3 with the conduit 76, and the intermediate ports 82 of the cylinders 2 and 4 with the conduit 75.

As already explained, the said valves by reason of the offset slots in the operating buttons 14, 15, 16 and 17 may be reciprocated to positions at either end of their respective cylinders and are adapted to be temporarily brought to rest intermediate of such positions by reason of the offset nature of the slots in the said buttons and in the retracted positions of the valves, that is, when the buttons are not depressed, all communication is shut off as will be seen by an examination of Figures 8 and 13 between the feed line 71 and the conduit 73, 74, 75, 76 or 77. In the neutral positions of the valves, however, the passages 65 and 66 thereof establish communication between the inlet port 67 of the cylinders and the outlet port 78 thereof as will be seen by an examination of Figures 9 and 10, and when the valves are moved into the cylinders to their full extent as in the case of the valve 8 in Figure 2 of the drawings the passages 64 and 65 establish direct communication with the outer and intermediate outlet ports of the cylinders, thereby admitting fluid under pressure to the conduits 73 and 76 in the case of the cylinder 1, 73 and 75 in the case of the cylinder 2, 74 and 76 in the case of the cylinder 3, and 74 and 75 in the case of the cylinder 4.

Figures 13, 14, 15 and 16 clearly indicate the four principal positions of any of the valves, the valve 6 and its cylinder being taken for the example, Figure 13 showing the inoperative position wherein no parts are open. In Figure 14, the valve has been moved to its neutral position, establishing communication between the port 67 and port 78, all the other ports being closed. In Figure 15 it will be seen that the further movement of the valve in the same direction first results in the transverse passage 64 effecting communication between the ports 68 and 79, which ensures the piston assuming its rotated position in one or other direction and selective engagement of the gear selector arm with the required gear selector fork 30 or 31, as will be hereinafter explained, before reciprocal motion is imparted to the piston, as will result upon the valve being moved to its full operative position, which is that indicated in Figure 16 wherein the ports 67 and 81 are also brought into communication.

The conduits 73, 74, 75 and 76 communicate with the ports 54, 55, 52$^a$ and 51$^a$ respectively of the master valve housing 41, and the conduit 77 communicates with a port 53 of the said master valve casing and also through a branch 77$^a$ with the cylinder 38 of the clutch operating device.

The operation of the piston 22 for the purpose of selecting and moving the elements of the change speed gear mechanism 32 is effected by selectively admitting fluid under pressure to the conduits 73, 74, 75, 76 or 77 which is effected by the operation of the valves 1, 2, 3 or 4. When any valve is in its operative position it admits fluid under pressure to two of the conduits 73, 74, 75 and 76, depending upon which of the valves is in such position. Thus, in the operative position, the valve 6 establishes communication with the conduits 73 and 76; the valve 7, the conduits 73 and 75; the valve 8, the conduits 74 and 76, and the valve 9, the conduits 74 and 75, as will be clearly apparent from an examination of Figures 8 to 11. Further, if one or more of the valves be in the neutral position as are the valves 7 and 8 in Figure 3, fluid under pressure is admitted to the conduit 77, and therefore the chamber 43 of the master valve and to the cylinder 38 of the clutch operating device for the disengaging of the clutch 33.

It has already been stated that the piston 22 has both a reciprocating and a partial rotating motion. These do not however take place together, but the rotary motion is effected intermediate of the stroke of the piston. The reciprocating action of the piston effects the rotation of the master valve in its casing, and the master valve controls the rotation of the piston as will now be more specifically explained.

The piston 22 is spool shaped and includes a hub 178 and a shell 179, the hub having an end wall or flange 180, and the shell an end wall 181, the said shell being cut away at the upper and lower parts of its outer wall and between the said end walls to provide substantial openings 83 and 84, 85 and 86 being shell walls extending radially inward of the margins of the opening 83 to the said hub, whereby a chamber 87 is provided in the upper side of the piston.

Slidable within the hub 178 of the piston is a stem 88 provided with an annular recess 89 associated with radial passages 90 in the said hub, through which recess and passages communication between the chamber 87 and the interior of the piston may be established.

It should be noted that in this construction the rod 24 is fixedly connected to the piston by the pin 25 and that the stem 88 of the disk valves 93 and 94 is slotted at 112 so that it may slide over the said rod and within the hub of the piston.

91 and 92 are ports in the end walls of the piston, and the disk valves 93 and 94 are adapted to close either the ports 91 or the ports 92 according to a longitudinal disposition of the slidable stem 88 in the piston. These disk valves 93 and 94 are provided with annular webs 95 entering circular recesses 96 in the ends of the piston whereby chambers 97 and 98 are provided between the said valves 93 and 94 respectively, and the adjacent ends of the piston.

The presence of the piston in the cylinder, of course, provides end chambers 99 and 100, the first of which communicates with the disk valve member 98 through a passage 101 in the hub, and the latter chamber 100 with the disk valve chamber 97 through a passage 102.

In the upper part of the cylinder is a deep longitudinal recess 103 in which is slidably accommodated the upper portion of a flat T-shaped partition member or blade 104, the lower portion of which extends into the chamber 87 of the piston and is provided with a rocker foot 105 concaved at 106 and 107 so that, when rocked in one or other of the directions permitted, it may snugly bear against the arcuate surface of the hub 178 of the piston. The concaved surface 106 or 107 of the foot not so bearing upon the hub, ensures a clearance space under that particular portion of the foot.

The member 104 and its foot form an effective longitudinal partitioning of the chamber 87, and it will be noted that the lateral walls 85 and 86 of the said chamber 87 are so inclined in their inner ends adjacent the hub that upon the rotation of the piston in one or other direction as far as permitted by the said foot, the adjacent wall 85 or 86, as the case may be, will effect the depression of that side of the foot into engagement with the hub and the consequent raising of the opposite side of the foot from the hub. The passage 90 in the hub is so disposed that it will be disclosed by a raising of the foot of the partition member, in the manner described, on one or other side of the said partition member according to the direction in which the piston has been rotated.

Projecting into the cylinder recess 103 from the lower part of the master valve is an operating member 108 provided at its lower end with a projection 109 adapted to move in a U-slot 110 formed in the upper part of the partition member 104 and about an abutment 111, so that, when the piston and its partition member are moved to one or other end of the cylinder, the abutment is positioned immediately beyond the projection 109 and passes over the said projection in the intermediate position of the piston as will be apparent from an examination of Figures 3 and 4. Thus the movement of the piston in one or other direction will effect the rocking of the master valve through the medium of the said operating member 108.

113 and 114 are abutments extending inwardly of the ends of the cylinder 23, the purpose of which will be further explained hereinafter, and 115 is a discharge pipe communicating through the opening 84 with the interior of the piston, and leading to a reservoir 116 from which oil is supplied by the pump 117 to the pressure tank 72.

This pressure tank is indicated as having an overflow pipe 118 leading therefrom back to the reservoir 116 through a pressure controlled valve 119 of any suitable type. The inflow end of the said pipe 118 is shown as depending substantially into the fluid in the pressure tank 72 so that an amount of air may be sealed in the tank above such surface of the fluid and act as a cushion to absorb shock in the fluid circulatory system.

In describing the operation of the device, attention is first directed to Figure 1, which indicates the parts in the positions which they occupy after actuation to bring the high gear into operation, and, in assuming this position, the abutment 111 by engaging the projection 109 of the master valve has rotated the said master valve into the position which is necessary for the effecting of any further change of gear from the high speed engagement. Also, the said abutment 111 has passed beyond the said projection so that it is now ready to rotate the master valve in the opposite direction, upon movement of the piston in such opposite direction.

It will be further seen that full depression of the high gear button 17 bringing the high gear valve 9 into operative position is accompanied by and is only possible if the remaining buttons and their valves are brought to an inoperative position, due to the presence of pivoted rocking arms 120, 121 and 122 carried by the frame 18 engaging projections 123 on the rod 13, and projections 124, 125, 126 on the rods 10, 11 and 12 respectively. Similarly pivoted rocker arms 127 and 128 interlock the rod 10 with the rods 12 and 11 respectively, and the pivoted arm 129 effects an interlocking of the rods 11 and 12.

With the parts in the positions indicated in Figure 1, if it be now desired to change to say, intermediate gear, the intermediate gear button 16 is depressed and is temporarily arrested when the offset portion 21 of the slot thereof is entered by the pin 19, and this movement is also accompanied by the outward movement of the high gear button 17 by reason of the actuation of the rocker arm 122 previously referred to, so that the valves 8 and 9 are both brought to a neutral position and fluid is admitted under pressure to the pipe 77 and incidentally to the chamber 43 of the master valve, as well as to the cylinder 38 of the clutch operating device whereupon the piston 37 is forced outwardly and, through the medium of the link 39, throws out the clutch 33.

Fluid under pressure also passes through the chamber 43 and port 49 of the master valve into the passage 51 and end chamber 99 of the cylinder 23 exerting pressure on the adjacent end of the piston due to the fact that the disk valve 93 is closed upon the piston ports 91 and consequently moves the piston towards the center of the cylinder. No fluid resistance is met with at the opposite end of the piston as the piston ports 92 are open.

When the piston reaches the central or neutral position, the abutment 111 of the T-member 104 has effected the movement of the projection 109 of the master valve operating member 108 in the same direction so that, the piston having moved through one-half of its stroke, the said projection 109 drops beneath the said abutment 111 and the outlet ports 49 and 50 of the intermediate chamber of the master valve are closed. In this position, however, the outlet ports 47 and 48 of the chambers 42 and 44 of the master valves are brought into coincidence with the passages 51 and 52 respectively of the cylinder.

If the intermediate button 16 be then pressed into its full extent as indicated in Figure 2, fluid pressure being admitted to the conduit 76 and through the chamber 42 and passage 51 to the cylinder, the piston is still further urged towards the opposite end of the cylinder. This results in the disk valve 94 striking the abutment 114 in the end of the cylinder, whereupon the ports 92 are closed and the ports 91 opened. By this motion of the piston the gear mechanism is set in its intermediate or second speed gear ratio.

The pressing fully inward of the intermediate button also causes its valve to close off fluid admission to the conduit 77, and accordingly to the cylinder 38 of the clutch operating device, and, under the influence of the spring 35 the clutch closes, due to the fact that pressure on the piston 37 is relieved, the fluid from the said cylinder 38 escaping through a relief valve 150 and pipe 151 to the main storage tank 116.

In further operating the device to set the gear mechanism in low gear, the low gear button 15 is first pressed half way in, as shown in Figure 3, whereupon fluid under pressure is admitted to the end chamber 100 of the cylinder forcing the piston towards the center of the cylinder, which again results in the master valve assuming its neutral position indicated in the said Figure 3, and the declutching operation is also, at the same time, repeated. With the movement of the button 15, the intermediate gear button 16 is moved outwardly to a neutral position, shutting off the flow through the conduits 74 and 76.

The parts having now assumed a neutral position, the low gear button is pressed inwards to its full extent, which first results in fluid being admitted to the conduit 73 through the passage 64 of the low gear valve 7 and then also to the conduit 75 as the inward movement of the valve is completed. The first result is for fluid to pass into the chamber 58 of the master valve and into the pocket between the T-member 104 of the piston and the wall 85 thereof, which forces the said wall 85 outwardly of the said T-member rotating the piston until the wall 86 engages the foot 105 of the said T-member and tilts it in the opposite direction to that indicated in Figure 4, thereby relieving pressure in the then expanded chamber between the wall 85 and the T-member 104, due to the fact that the tilting of the foot 105 permits fluid to pass beneath the convex surface 106 of the foot and escape through the passage 90 to the interior of the piston and therefrom through the pipe 115 to the storage tank 116.

As this rotation of the piston takes place in the neutral position of the parts and is accompanied by the rotation of the piston rod 24, it follows that the gear selector arm 29 will be swung out of engagement with the high and intermediate gear selector fork 30 and into engagement with the low and reverse gear selector fork 31, as required in stepping from intermediate to low gear.

Accordingly, the mechanism is now coordinated for the completion of the low gear engaging movement which will result upon the complete pressing inward of the low gear button 15 accompanied by the automatic movement outwardly of the intermediate button 16, whereupon the intermediate valve 8 will be moved to its inoperative position and the low gear valve will open both the conduits 73 and 75 to fluid pressure, the master valve then being in the position indicated in Figure 3 when fluid from the conduit 75 may pass through the master valve chamber 44 and cylinder part 52 to the cylinder chamber 100, driving the piston forward and effecting the low gear intermeshing of the gear mechanism 32 at the same time causing disk valve 93 to engage the abutment 113 of the cylinder, whereupon the piston closing on the said disk valve 93 will close the ports 91 and open the ports 92.

The piston is again, in that position of the parts, ready to be moved in an opposite direction when the valves are manipulated for that purpose. Incidentally the master valve has been rotated to the position indicated in Figure 1 in order to ensure co-relation of the parts required to effect such opposite movement of the piston upon such manipulation of the valves.

To bring the master valve to rest at its neutral position shown in Figures 3, 4 and 5, a spring pressed stop or latch 131 is provided and is shown as being mounted in a tubular casing 132 secured to the cover plate 133 of the master valve housing through which plate extends an axial shaft 134 of the said master valve. This shaft carries on its outer end a check member 135 notched at 136 to receive the lower end of the latch and provided at its lower end with a pivoted sleeve 137 through which a rod 138 passes, the said rod having a forked head 139 hingedly connected at 140 to a bracket 141 mounted on the cylinder 23. Mounted on the said rod between the sleeve 137 and the forked head 139 is a compression spring 142 which serves to effect a rapid rotation of the valve in one or other direction when its initial movement beyond the neutral point in such direction, disengaging the check plate 135 from the latch 136, has been effected, as will result when the projection 109 of the master valve 108 is engaged by one or other walls 143 or 144 of the recess 110 of the partition member 104, upon the movement of the piston reciprocally in one or other direction beyond its neutral position.

To prevent overriding of the neutral positions of the gear shifting piston and to arrest the parts in their gear set positions so that they are not likely to be unduly influenced by vibration, the gear selector forks are mounted upon slidably supported rods 146 having a series of notches 147 therein, one or other of which is engaged by a spring pressed member 145 when the said gear selector forks are moved to one or other of their several positions of adjustment.

Attention is further directed to the means for closing one or other of the series of cylinder ports 91 or 92. As already explained, the disk valves 93 and 94 are mounted on the opposite ends of a stem 88 slidable in the bore of the piston so that when one of the said valves is closed on the adjacent end of the piston the other valve is moved from the opposite end of the said piston, and, in the normal operation of the device, this movement is effected by the striking of one or other of the disk valves against one or other of the projections 113 or 114 within the cylinder. Sometimes however, the piston may come to rest intermediate of these projections and it may be desired to effect the movement of the piston in an opposite direction to that which it was travelling at the time it came to rest, which means that fluid pressure for that purpose would be directed against that end of the piston at which the disk valve is open, and that such valve must necessarily be closed before the required movement could be imparted to the said piston.

Presuming the parts to be in the position indicated in Figure 3 and it be desired to again effect an engagement of the intermediate gear, the operation of the intermediate gear button for that purpose would result in fluid under pressure being admitted through the chamber 42 of the master valve and passage 51 of the cylinder to the chamber 99 of the said cylinder, but with the disk valves in the position shown in the said Figure 3, fluid in the chamber 100 of the cylinder would obviously prevent movement of the piston in that direction.

However, it will be noted that the fluid admitted to the chamber 99 also enters the passage 101 in the hub of the piston and the disk valve chamber 98 whereby it forces the disk valve 94 outwardly of the piston opening the ports 92 and at the same time causes the disk valve 93 to close the ports 91 following which the required movement may be imparted to the piston. Similarly, the reverse action may be secured by admitting fluid under pressure to the chamber 100 whereby it is also admitted through the passage 102 to the disk valve chamber 97.

It will be understood that the actual form of the valves, gear mechanism and clutch are matters of design and convenience, for instance, the rotating motion of the piston may effect the meshing of the gears and the reciprocating motion the selecting of the gears to be meshed, and the invention may be developed within the scope of the following claims without departing from the essential features of the said invention, wherefore it is desired that the specification and drawings be read as merely illustrative and not in a limiting sense, except as necessitated by the prior art.

What we claim is:—

1. In combination with a change speed gear mechanism, having a shiftable and swingable gear selector arm, means operating said arm, said means including a piston operably connected to said arm and capable of both reciprocation and partial rotation, and selective valvular means controlling the application of hydraulic pressure to said piston whereby, according to the operation of said valvular means, said piston is reciprocated or rotated.

2. In combination with a change speed gear mechanism, a piston selectively operating said gear mechanism by reciprocation and by rotation, said piston being hydraulically reciprocated or rotated according to the direction of application of hydraulic pressure thereto, and a selective valve mechanism controlling such application of hydraulic pressure to said piston.

3. In combination with a change speed gear mechanism, a piston having a reciprocal gear setting movement and a rotary gear selecting movement, selective means for controlling the movements of said piston, a master control device interposed between said selective means and piston and adapted for actuation by the linear movement of said piston.

4. In combination with a change speed gear mechanism, a piston having a reciprocal gear setting movement and a rotary gear selecting movement, means controlling the application of hydraulic pressure to said piston for its reciprocation, and hydraulically controlled means determining the rotary position of said piston when it is moved to a point intermediate of its stroke.

5. In combination with a change speed gear mechanism, a piston operating said mechanism by both reciprocation and rotation, a selector valve device determining the hydraulic actuation of said piston, and a master valve timing and directing the admission of fluid under pressure to said piston.

6. In combination with a change speed gear mechanism, a gear changing piston capable of both reciprocation and rotation, a selector valve device determining the hydraulic actuation of said piston, and a master valve operable by said piston and timing and directing the admission of fluid under pressure to said piston.

7. In combination with a change speed gear mechanism, a hydraulic gear operating device, including a gear shifting piston, a selector valve mechanism determining the mode of actuation of said operating device according to the gear selection desired, and a master valve cooperating with said selector valve mechanism in the determining of the direction of application of hydraulic pressure to said piston.

8. In combination with a chain speed gear mechanism, a hydraulic gear operating device including a gear changing piston, a selector valve mechanism determining the mode of operation of said operating device according to the gear selection desired, and a master valve operable by said gear operating device determining the direction of application of hydraulic pressure to said piston.

9. In a device of the class described, a gear shifting piston adapted to reciprocating and rotary movements, said piston having a chamber in the side thereof, a partition longitudinally dividing said chamber into two compartments, and a valve device controlling the admission of fluid under pressure to one or other of said compartments whereby the rotation of said piston in one or other direction is effected.

10. In a device according to claim 9, valvular means controlling the admission of fluid under pressure to said compartments, so that such admission is permitted when the piston is in an intermediate reciprocal position.

11. In a device according to claim 9, a master valve controlling the inlet of fluid under pressure to said compartments, said master valve being operated by said piston.

12. In a device according to claim 9, a master valve controlling the inlet of fluid under pressure to said compartments, said master valve being operated by said piston, and a selector valve mechanism determining both the reciprocal and rotary operation of said piston.

13. In a device of the type described, a gear shifting piston adapted to both reciprocal and rotary movements, a selector valve mechanism determining the movements of said piston, and a master valve having a movable operating element lying in the path of said piston.

14. In a device of the type described, a gear shifting piston adapted to reciprocation for the engaging of gears and rotation intermediate of its reciprocal movement for the selection of gears, a selector valve mechanism controlling the hydraulic operation of said piston, and means insuring a pause in the operation of said piston intermediate of its stroke to permit the rotation thereof when such rotation is required.

15. In a device according to claim 14, hydraulic declutching mechanism adapted to be brought into operation by said selector valve mechanism when said piston is into its intermediate position.

16. In combination with a change speed gear mechanism, hydraulic gear shifting mechanism including a gear shifting piston adapted to reciprocation and to rotation under the influence of fluid pressure, means controlling the application of such pressure to determine the direction of reciprocation or of rotation of said piston, said means being in the form of a selective valve mechanism admitting fluid under pressure to said piston for its reciprocation in one or other direction according to the adjustment of said valve mechanism and to said piston to determine its rotated position intermediate of its stroke.

17. In combination with a change speed gear mechanism, a hydraulic gear operating device including a gear shifting piston adapted to reciprocation, and to rotation intermediate of its stroke, and a series of valves forming a selective valve mechanism determining the movements of said piston, each of said valves being adapted when fully operated to control the reciprocal and rotary movements of said piston required to secure a predetermined gear setting, said valves further effecting the bringing of the piston to a position intermediate of its stroke when any valve is being moved towards its fully operative position, whereby said piston may be, in such intermediate position, rotated in one or other direction before completion of its stroke.

18. The combination according to claim 17, and means determining the direction of rotation of said piston in such intermediate position.

19. The combination according to claim 17, and a master valve operable by said piston cooperating with said selective valve mechanism in controlling the application of hydraulic pressure to said piston.

20. In a device of the class described, a selector valve mechanism including a casing, a series of piston valves in said casing, a series of conduits controlled by said piston valves and adapted to direct fluid under pressure to the said piston to effect its reciprocal or rotary movement according to the conduits selected by said valves, a declutching mechanism, and a further conduit operatively connected to said declutching mechanism and adapted to admit fluid under pressure to said piston to bring it to a position intermediate of its stroke, said valves being adapted to first admit fluid to said last mentioned conduit before selectively admitting fluid to others of said conduits.

21. In a device of the class described, a selector valve mechanism including a casing, a series of piston valves in said casing, a series of conduits controlled by said piston valves and adapted to direct fluid under pressure to the said piston to effect its reciprocal or rotary movement according to the conduits selected by said valves, a declutching mechanism, a further conduit operatively connected to said declutching mechanism and adapted to admit fluid under pressure to said piston to bring it to a position intermediate of its stroke, said valves being adapted to first admit fluid to said last mentioned conduit before selectively admitting fluid to others of said conduits, and a master valve operated by said piston determining the direction of application of fluid under pressure from said conduits to said piston according to the position of said piston.

22. In a device of the class described, in combination with a change speed gear mechanism, and a gear selecting and moving device, a piston operating said device and reciprocally movable into and out of neutral relationship to said gear mechanism, means whereby said piston may be hydraulically rotated in neutral position in one or other direction, to effect a gear selecting operation of said device, and means determining the direction of such rotation.

23. In a device of the class described, in combination with a change speed gear mechanism, and a gear selecting and moving device, said device being movable in opposite directions into gear setting positions and swingable intermediate of said positions for gear selecting purposes, a piston operably connected to said device, means arresting said piston intermediate of its stroke to bring said device to its gear selecting position, and means effecting the hydraulic rotation of said piston in such position in one or other direction, when in such position, whereby the gear selection of said device is effected.

24. In a device of the class described, a gear operating device including a piston adapted to rotation intermediate of its stroke, said piston having a chamber in its side, a partition member extending longitudinally of said chamber and dividing it into two compartments, and means controlling the admission of fluid under pressure to one or other side of the partition for the rotation of the said piston in one or other direction.

25. A gear operating device according to claim 24, wherein an outlet is provided from said chamber and said partition member closes said outlet from the compartment to which fluid under pressure is admitted until the resulting rotation of the piston has taken place.

26. A gear operating device according to claim 24, wherein the chamber is provided with an outlet and the partition member with a valve, and means whereby said valve is caused to open to provide communication between the compartment to which fluid under pressure has been admitted and said outlet upon the completion of rotation of said piston by said fluid.

27. In a device of the class described, hydraulic gear shifting mechanism including a gear shifting piston adapted for reciprocation under the influence of fluid pressure, said piston being ported in its ends, and co-operating valves operable to close the ports on the pressure end of the piston and open the ports on the opposite end thereof, said piston being provided with passages permitting pressure on one end thereof to act upon the inner side of the valve on the opposite end of the piston to insure the closing of the other valve on the pressure end of the piston so that the pressure fluid may be applied thereto.

28. In a gear shifting device of the type described, a cylinder, a gear-changing piston in said cylinder, a radial blade on and movable with said piston, a master valve movable by said blade, and a manually operable selective valve mechanism cooperating with said master valve in directing fluid to one or other side of said blade and to one or other end of said piston to effect a required gear-changing movement of said piston.

29. A gear shifting device of the type described, a cylinder, a gear-changing piston in said cylinder, said piston having a lateral chamber therein, a radial partition dividing said chamber longitudinally and reciprocable with said piston, valve means admitting fluid to one or other side of said partition for the partial rotation of said piston in one or other direction, and a master valve cooperating with said valve means and actuated by said partition for controlling the admission of fluid to one or other end of said cylinder, so that said piston may be reciprocated in any of the positions to which it may have been rotated for gear selection and shifting.

30. In a gear shifting device of the type described, a fluid operated piston adapted to shift gears from and through a neutral position to a desired setting, means directing fluid against said piston to effect its rotation for gear selection when in a neutral position, a master valve, means operated by said piston actuating said master valve to control the conducting of fluid to one or other end of said cylinder, and manually operable selective valve mechanism cooperating with said master valve to effect the hydraulic motion of said piston to a neutral position, its rotation if desired to a gear selecting position whilst in such neutral position, and its further motion in the required direction for the completion of the gear shifting operation.

In testimony whereof we affix our signatures.

WALTER H. BICE.
WILLIAM E. BICE.